United States Patent
Koudas et al.

(10) Patent No.: US 7,451,144 B1
(45) Date of Patent: Nov. 11, 2008

(54) METHOD OF PATTERN SEARCHING

(75) Inventors: Nikolaos Koudas, Springfield, NJ (US);
Divesh Srivastava, Summit, NJ (US);
Jignesh M. Patel, Sylvania, OH (US);
Shurug Ali Al-Khalifa, Ann Arbor, MI (US); Hosagrahar V. Jagadish, Ann Arbor, MI (US); Yuqing Wu, Windsor (CA)

(73) Assignee: AT&T Corp., New York, NY (US)

( * ) Notice: Subject to any disclaimer, the term of this patent is extended or adjusted under 35 U.S.C. 154(b) by 208 days.

(21) Appl. No.: 10/748,832

(22) Filed: Dec. 30, 2003

Related U.S. Application Data

(60) Provisional application No. 60/450,222, filed on Feb. 25, 2003.

(51) Int. Cl.
*G06F 7/00* (2006.01)
*G06F 17/30* (2006.01)

(52) U.S. Cl. ......................................... 707/6; 707/100
(58) Field of Classification Search ................ 707/1, 707/5, 102, 2–7, 10, 100; 715/513; 717/138
See application file for complete search history.

(56) References Cited

U.S. PATENT DOCUMENTS

| | | | |
|---|---|---|---|
| 6,292,938 B1 * | 9/2001 | Sarkar et al. ................. | 717/138 |
| 6,374,235 B1 | 4/2002 | Chen et al. | |
| 6,374,252 B1 * | 4/2002 | Althoff et al. ................ | 707/102 |
| 6,470,344 B1 * | 10/2002 | Kothuri et al. .............. | 707/100 |
| 6,826,553 B1 * | 11/2004 | DaCosta et al. ................ | 707/1 |
| 6,859,455 B1 * | 2/2005 | Yazdani et al. .............. | 370/392 |
| 7,308,449 B2 * | 12/2007 | Fairweather ................. | 707/10 |
| 2003/0237047 A1 * | 12/2003 | Borson ........................ | 715/513 |

* cited by examiner

*Primary Examiner*—Hung T Vy

(57) ABSTRACT

Structural join mechanisms provide efficient query pattern matching. In one embodiment, tree-merge mechanisms are provided. In another embodiment, stack-tree mechanisms are provided.

8 Claims, 13 Drawing Sheets

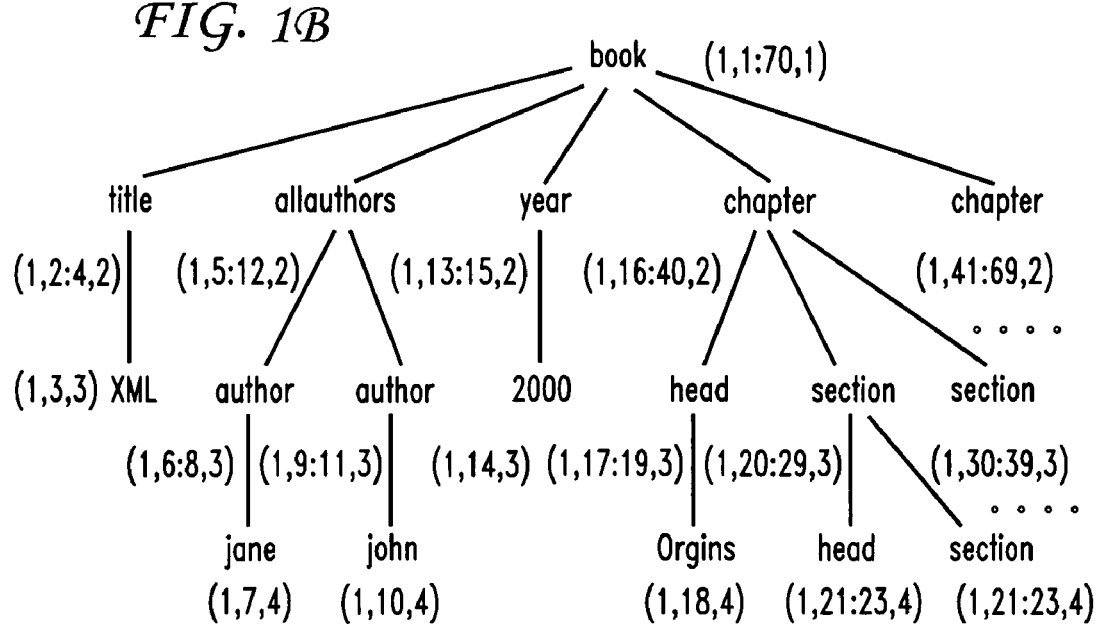

*FIG. 2A*

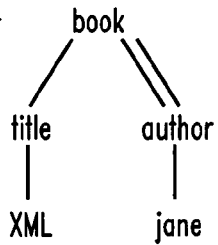

*FIG. 2B*

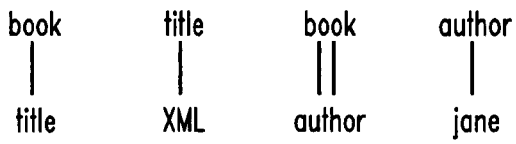

*FIG. 3*

Algorithm Tree-Merge-Anc (AList, DList)
/* Assume that all nodes in AList and DList have the same DocId */
/* Alist is the list of potential ancestors, in sorted order of StartPos */
/* DList is the list of potential descendants in sorted order of StartPos */ begin-desc = DList->firstNode; OutputList = NULL;
for (a = AList->firstNode; a ! = NULL; a = a->nextNode) {
   for (d = begin-desc; (d ! = NULL && d.StartPos < a.StartPos) ; d = d->nextNode) {
      /* skipping over unmatchable d's */ }
   begin-desc = d;
   for (d = begin-desc; (d ! = NULL && d.EndPos < a.EndPos); d = d->nextNode) {
      if ( (a.StartPos < d.StartPos) && (d.EndPos < a.EndPos)
          [&& (d.LevelNum = a.LevelNum + 1)]) {
        /* the optional condition is for parent-child relationship */
        append (a,d) to OutputList; }
   }
}

FIG. 4

```
Algorithm tree-merge-Desc (AList, DList)
/* Assume that all nodes in AList and DList have the same DocId */
/* Alist is the list of potential ancestors, in sorted order of StartPos */
/* DList is the list of potential descendants in sorted order of StartPos */ begin-anc = AList->firstNode; OutputList = NULL;
for (d = DList->firstNode; d != NULL; d = d->nextNode) {
   for (a = begin-anc; (a != NULL && a.EndPos < d.StartPos); a = a->nextNode) {
      /* skipping over unmatchable a's */ }
   begin-anc = a;
   for (a = begin-anc; (a != NULL && a.StartPos); a = a->nextNode) {
      if ( (a.StartPos < d.StartPos) && (d.EndPos < a.EndPos)
            [&& (d.LevelNum = a.LevelNum + 1) ] ) {
         /* the optional condition is for parent-child relationships */
         append (a,d) to OutputList; }
   }
}
```

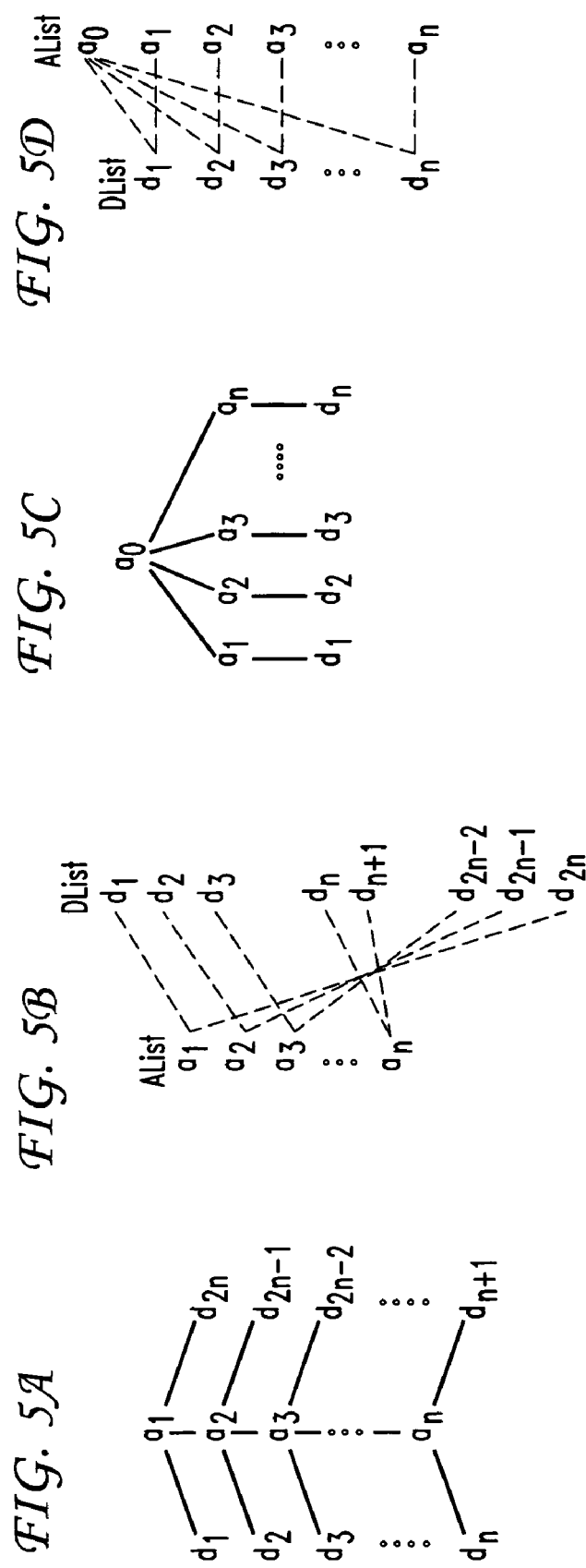

FIG. 6

Algorithm Stack-Tree-Desc (AList, DList)
/* Assume that all nodes in AList and DList have the same DocId */
/* AList is the list of potential ancestors, in sorted order of StartPos */
/* DList is the list of potential descentants in sorted order of StartPos */

```
a = AList->firstNode; d = Dlist->firstNode; OutputList = NULL;
while (the input list are not empty or the stack is not empty) {
    if ( (a.StartPos > stack->top.EndPos) && (d.StartPos > stack->top.EndPos) ) {
        /* time to pop the top element in the stack */
        tuple = stack->pop(); }
    else if (a.StartPos < d.StartPos) {
        stack->push (a)
        a = a->nextNode }
    else {
        for (al = stack->bottom; al != NULL; al = al->up) {
            append (al,d) to OutputList
        }
        d = d->nextNode
    }
}
```

FIG. 8

```
Algorithm Stack-Tree-Anc (AList, DList)
/* Assume that all nodes in AList and DList have the same DocId */
/* AList is the list of potential ancestors, in sorted order of StartPos */
/* DList is the list of potential descentants in sorted order of StartPos */ a = AList->firstNode; d = Dlist->firstNode; OutputList = NULL;
while (the input list are not empty or the stack is not empty) {
    if ( (a.StartPos > stack->top.EndPos) && (d.StartPos > stack->top.EndPos) ) {
        /* time to pop the top element in the stack */
        tuple = stack->pop(); }
        if (stack->size == 0) { /* we just popped the bottom element */
            append tuple.inherit-list to OutputList }
        else {
            append tuple.inherit-list to tuple.self-list
            append the resulting tuple.self-list to stack->top.inherit-list
        }
    }
    else if (a.StartPos < d.StartPos) {
        stack->push (a)
        a = a->nextNode }
    else {
        for (al = stack->bottom; al != NULL; al = al->up) {
            if (al == stack->bottom) append (al,d) to OutputList
            else append (al,d) to the self-list of al
        }
        d = d->nextNode
    }
}
```

FIG. 9

```
<!ELEMENT manager (name, (manger | department | employee)+)>
<!ATTLIST manager id CDATA #FIXED "1">
<!ELEMENT department (name, email?, employee+, department*)>
<!ATTLIST department id CDATA #FIXED "2">
<!ELEMENT employee (name+, email?)>
<!ATTLIST employee id CDATA #FIXED "3">
<!ELEMENT name (#PCDATA)>
<!ATTLIST name id CDATA #FIXED "4">
<!ELEMENT email (#PCDATA)>
<!ATTLIST email id CDATA #FIXED "5">
```

FIG. 9A

| Node | Count |
|---|---|
| manager | 25,880 |
| departmaent | 342,450 |
| employee | 574,530 |
| email | 250,530 |

FIG. 9B

| Query | XQuery Path Expression | Result Cardinality |
|---|---|---|
| QS1 | employee/email | 140,700 |
| QS2 | employee//email | 142,958 |
| QS3 | manger/department | 16,855 |
| QS4 | manager//department | 587,137 |
| QS5 | manager/employee | 17,259 |
| QS6 | manager//employee | 990,774 |
| QC1 | manager/employee/email | 7,990 |
| QC2 | manager//employee/email | 232,406 |

METHOD OF PATTERN SEARCHING

CROSS REFERENCE TO RELATED APPLICATIONS

The present application claims the benefit of U.S. Provisional Patent Application No. 60/450,222, filed on Feb. 25, 2003, which is incorporated herein by reference.

STATEMENT REGARDING FEDERALLY SPONSORED RESEARCH

The Government may have certain rights in the invention pursuant to a National Science Foundation grant under Grant Numbers IIS-9986030 and IIS-0208852.

FIELD OF THE INVENTION

The present invention relates generally to processing queries in a computer system and, more particularly, to processing computer queries using pattern matching.

BACKGROUND OF THE INVENTION

As is known in the art, the eXtensible Markup Language (XML) employs a tree-structured model for representing data. Queries in XML query languages typically specify patterns of selection predicates on multiple elements that have some specified tree structured relationships. For example, the XQuery path expression:

book[title='XML']//author[.='jane']

matches author elements that (i) have as content the string value "jane", and (ii) are descendants of book elements that have a child title element whose content is the string value "XML".

This XQuery path expression can be represented as a node-labeled tree pattern with elements and string values as node labels. Such a complex query tree pattern can be decomposed into a set of basic parent-child and ancestor-descendant relationships between pairs of nodes. For example, the basic structural relationships corresponding to the above query are the ancestor-descendant relationship (book, author) and the parent-child relationships (book, title), (title, XML) and (author, jane). The query pattern can then be matched by (i) matching each of the binary structural relationships against the XML database, and (ii) "stitching" together these basic matches. Finding all occurrences of these basic structural relationships in an XML database is a core operation in XML query processing, both in relational implementations of XML databases, and in native XML databases.

There have been various attempts determine how to find occurrences of such structural relationships (as well as the query tree patterns in which they are embedded) using relational database systems, as well as using native XML query engines. These works typically use some combination of indexes on elements and string values, tree traversal algorithms, and join algorithms on the edge relationships between nodes in the XML data tree.

One known attempt is described in C. Zhang, J. Naughton, D. Dewitt, Q. Luo, and G. Lohman, "On supporting containment queries in relational database management systems," *Proceedings of SIGMOD*, 2001, hereinafter "Zhang"), which is incorporated herein by reference. Zhang proposes a variation of the traditional merge join algorithm, called the multi-predicate merge join (MPMGJN) algorithm, for finding all occurrences of the basic structural relationships (referred to as containment queries). Zhang compared the implementation of containment queries using native support in two commercial database systems, and a special purpose inverted list engine based on the MPMGJN algorithm. The results in Zhang showed that the MPMGJN algorithm could outperform standard Relational Database Management System (RDBMS) join algorithms by more than an order of magnitude on containment queries. The key to the efficiency of the MPMGJN algorithm is the "(DocId, StartPos:EndPos, LevelNum) representation of positions of XML elements, and the "(DocId, StartPos, LevelNum)" representation of positions of string values, that succinctly capture the structural relationships between elements (and string values) in the XML database. Checking that structural relationships in the XML tree, like ancestor-descendant and parent-child (corresponding to containment and direct containment relationships, respectively, in the XML document representation), are present between elements amounts to checking that certain inequality conditions hold between the components of the positions of these elements.

While the MPMGJN algorithm outperforms standard RDBMS join algorithms, a significant amount of unnecessary computation and I/O operations are performed for matching basic structural relationships, especially in the case of parent-child relationships (or, direct containment queries).

It would, therefore, be desirable to overcome the aforesaid and other disadvantages.

SUMMARY OF THE INVENTION

The present invention provides a system and method for efficient query pattern matching. The inventive join methods match structural relationships against a database, such as an XML database. While the invention is primarily shown and described in conjunction with XML query pattern matching, it is understood that the invention is applicable to a variety of database types having structural relationships.

In one aspect of the invention, tree-merge query processing is provided. In another aspect of the invention, stack-tree query processing is provided. The tree-merge and stack tree processing provides efficient query pattern matching in XML databases, for example.

BRIEF DESCRIPTION OF THE DRAWINGS

The invention will be more fully understood from the following detailed description taken in conjunction with the accompanying drawings, in which:

FIG. 1A is a pictorial representation of an exemplary XML document fragment that can be processed in accordance with the present invention;

FIG. 1B is a tree representation of a the XML document fragment of FIG. 1A;

FIG. 2A is a pictorial representation of an exemplary tree pattern that can be processed in accordance with the present invention;

FIG. 2B is a pictorial representation of the structural relationships of the tree pattern of FIG. 2A;

FIG. 3 is a textual representation of an exemplary Tree-Merge-Anc algorithm implementation in accordance with the present invention;

FIG. 4 is a textual representation of an exemplary Tree-Merge-Desc algorithm implementation in accordance with the present invention;

FIGS. 5A and 5B are pictorial representations of worst case scenarios for the Tree-Merge-Anc algorithm of FIG. 3;

FIGS. 5C and 5D are pictorial representations of worst case scenarios for the Tree-Merge-Desc algorithm of FIG. 4;

FIG. 6 is a textual representation of an exemplary Stack-TreeDesc algorithm implementation in accordance with the present invention;

FIG. 8 is a textual representation of an exemplary Stack-Tree-Anc algorithm in accordance with the present invention;

FIG. 9 is a textual representation of an exemplary DTD that can be used in an exemplary implementation of the invention;

FIG. 9A is a textual representation of characteristics of the dataset of FIG. 9;

FIG. 9B is a textual representation of queries that can be used in an exemplary implementation of the invention;

DETAILED DESCRIPTION OF THE INVENTION

Figure 3A:
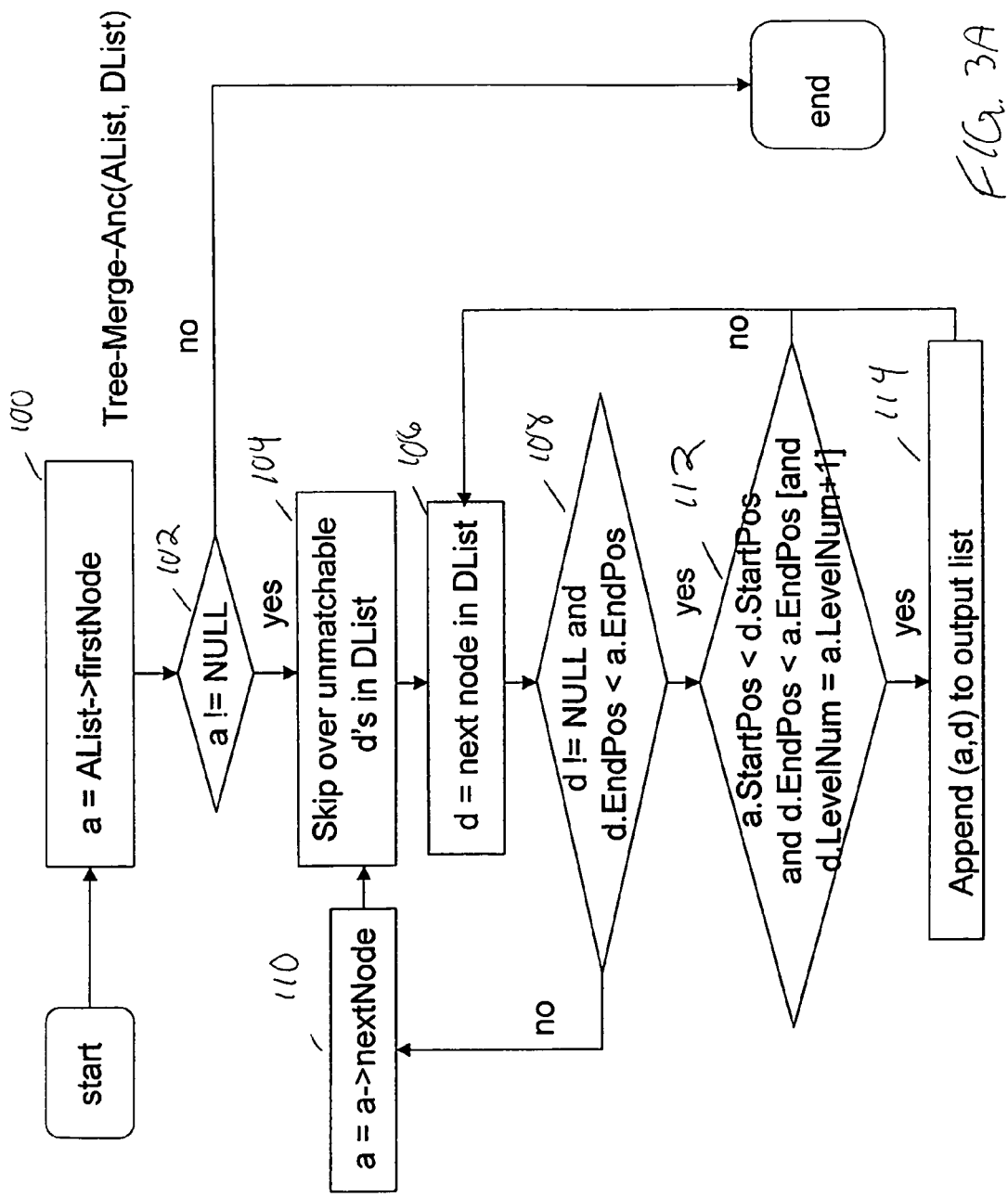
FIG. 3A is a flow diagram showing an exemplary sequence of steps for implementing the algorithm of FIG. 3.

XML queries typically specify patterns of selection predicates on multiple elements that have some specified tree-structured relationships. The primitive tree-structured relationships are parent-child and ancestor-descendant, and finding occurrences of these relationships in an XML database is a core operation for XML query processing.

Before describing the invention in detail, some basic XML concepts set forth. An XML database is a forest of rooted, ordered, labeled trees, with each node corresponding to an element and the edges representing (direct) element-subelement relationships. Node labels include a set of (attribute, value) pairs, which suffices to model tags, Parsible Character Data (PCDATA) content, etc.

FIG. 1A shows an illustrative XML document for which a tree representation is shown in FIG. 1B. The utility of the numbers associated with the tree nodes will be described below. Queries in XML query languages, such as XQuery, Quilt, and XML-QL, use (node labeled) tree patterns for matching relevant portions of data in the XML database. The query pattern node labels include element tags, attribute-value comparisons, and string values, and the query pattern edges are either parent-child edges (depicted using single line) or ancestor-descendant edges (depicted using a double line). For example, the XQuery path expression in the introduction can be represented as the rooted tree pattern in FIG. 2A. This query pattern matches the document in FIG. 1A.

In general, at each node in the query tree pattern, there is a node predicate that specifies some predicate on the attributes (e.g., tag, content) of the node in question. It is understood that what is permitted in this predicate is not material. It suffices that there be the possibility of constructing efficient access mechanisms (such as index structures) to identify the nodes in the XML database that satisfy any given node predicate.

A complex query tree pattern can be decomposed into a set of basic binary structural relationships, such as parent-child and ancestor-descendant between pairs of nodes. The query pattern can then be matched by (i) matching each of the binary structural relationships against the XML database, and (ii) "stitching" together these basic matches. For example, the basic structural relationships corresponding to the query tree pattern of FIG. 2A are shown in FIG. 2B.

One conventional approach to matching structural relationships against an XML database is to use traversal-style algorithms by using child-pointers or parent-pointers. Such "tuple-at-a-time" processing strategies are known to be relatively inefficient compared to the set-at-a-time strategies used in database systems. Pointer-based joins have been shown to be relatively efficient in object-oriented databases.

In the context of XML databases, nodes may have a large number of children, and the query pattern often requires matching ancestor-descendant structural relationships (for example, the (book, author) edge in the query pattern of FIG. 2A, in addition to parent-child structural relationships. In this case, there are two options: (i) explicitly maintaining only (parent, child) node pairs and identifying (ancestor, descendant) node pairs through repeated joins; or (ii) explicitly maintaining (ancestor, descendant) node pairs. The former approach may require excessive query processing time, while the latter approach would use excessive (quadratic) space. In either case, using pointer-based joins is likely to be infeasible.

One factor in generating an efficient, uniform mechanism for set-at-a-time (join-based) matching of structural relationships is a positional representation of occurrences of XML elements and string values in the XML database, which extends the classic inverted index data structure in information retrieval as is well known in the art. The position of an element occurrence in the XML database can be represented as the 3-tuple (DocId, StartPos:EndPos, LevelNum), and the position of a string occurrence in the XML database can be represented as the 3-tuple (DocId, StartPos, LevelNum), where (i) DocId is the identifier of the document; (ii) StartPos and EndPos can be generated by counting word numbers from the beginning of the document with identifier DocId until the start of the element and end of the element, respectively; and (iii) LevelNum is the nesting depth of the element (or string value) in the document. FIG. 1B, for example, depicts a 3-tuple with each tree node, based on this representation of position. Note that the DocId for each of these nodes is chosen to be one.

Structural relationships between tree nodes (elements or string values) whose positions are recorded in this fashion can be determined relatively easily: (i) ancestor-descendant: a tree node $n_2$ whose position in the XML database is encoded as $(D_2, S_2: E_2, L_2)$ is a descendant of a tree node $n_1$ whose position is encoded as $(D_1, S_1: E_1, L_1)$ iff (if and only if) $D_1=D_2$, $S_1<S_2$ and $E_2<E_1$; (ii) parent-child: a tree node $n_2$ whose position in the XML database is encoded as $(D_2, S_2: E_2, L_2)$ is a child of a tree node $n_1$ whose position is encoded as $(D_1, S_1: E_1, L_1)$ iff $D_1=D_2$, $S_1<S_2$, $E_2<E_1$, and $L_1+1=L_2$. It is understood that the following shorthand notation is used above: D=DocId, S=StartPos, E=EndPos, and L=LevelNum.

For example, in FIG. 1B, the author node with position (1, 6:8, 3) is a descendant of the book node with position (1, 1:70, 1), and the string "jane" with position (1, 7, 4) is a child of the author node with position (1, 6:8, 3).

It should be noted that in this representation of node positions in the XML data tree checking an ancestor-descendant structural relationship is as easy as checking a parent-child structural relationship. The reason is that one can check for an ancestor-descendant structural relationship without knowledge of the intermediate nodes on the path. It should also be noted that this representation of positions of elements and string values allow for checking order and proximity relationships between elements and/or string values.

In one aspect of the invention, the (DocId, StartPos:EndPos, LevelNum) representation of positions of XML elements and string values are utilized to achieve novel, I/O and CPU optimal (in an asymptotic sense) join algorithms for matching basic structural relationships (or, containment queries) against an XML database.

In general, the task of matching a relatively complex XML query pattern reduces to that of evaluating a join expression with one join operator for each binary structural relationship in the query pattern. It is understood that different join orderings may result in different evaluation costs.

Described below are two families of inventive join algorithms for matching parent-child and ancestor-descendant structural relationships efficiently: tree-merge and stack-tree algorithms.

Consider an ancestor-descendant (or parent-child) structural relationship $(e_1, e_2)$, for example, (book, author) (or (author, jane)) in the running example. Let AList=$[a_1, a_2, \ldots]$ and DList=$[d_1, d_2, \ldots]$ be the lists of tree nodes that match the node predicates $e_1$ and $e_2$ respectively, each list sorted by the (DocId, StartPos) values of its elements. There are a number of ways in which the AList and the DList could be generated from the database that stores the XML data. In one embodiment, a native XML database system stores each element node in the XML data tree as an object with the attributes: ElementTag, DocId, StartPos, EndPos, and LevelNum. An index can be built across all the element tags, which can then be used to find the set of nodes that match a given element tag. The set of nodes can then be sorted by (DocId, StartPos) to produce the lists that serve as input to the inventive join algorithms.

Given these two input lists, AList of potential ancestors (or parents) and DList of potential descendants (resp., children), the algorithms in each family can output a list OutputList=$[(a_i, d_j)]$ of join results, sorted either by (DocId, $a_i$.StartPos, $d_j$.StartPos) or by (DocId, $d_j$.StartPos, $a_i$.StartPos). Both variants are useful, and the variant chosen may depend on the order in which an optimizer chooses to compose the structural joins to match the complex XML query pattern.

In general, a modified merge-join is performed, possibly by performing multiple scans through the "inner" join operand to the extent necessary. Either AList or DList can be used as the inner (or outer) operand for the join: the results are produced sorted (primarily) by the outer operand.

FIG. 3 shows the tree-merge algorithm for the case when the outer join operand is the ancestor. Similarly, FIG. 4 shows the case when the outer join operand is the descendant. It is understood that for ease of understanding, both algorithms assume that all nodes in the two lists have the same value of DocId, their primary sort attribute. Dealing with nodes from multiple documents is straightforward, requiring the comparison of DocId values and the advancement of node pointers as in the traditional merge join.

FIG. 3A shows an exemplary sequence of steps for the inventive tree-merge-anc algorithm of FIG. 3. It is assumed that all nodes in Alist and Dlist have the same document ID DocID. It is understood that Alist refers to the list of potential ancestors in sorted order of the starting position StartPos and Dlist refers to the list of potential descendants in sorted order of StartPos.

In step 100, variable a is set to the first node in Alist and in step 102 it is determined whether the first node is not a null value. If not, processing terminates. If so (not a null value), in step 104, Dlist nodes d that are unmatchable are skipped over. In step 106, d is set to the next node in Dlist and it is determined in step 108 whether the current Dlist node d is a not a null value and the end position EndPos of the Dlist node is less than the end position of the current Alist node. If not, a is set to the next Alist node in step 110 and processing continues in step 104. If so, in step 112, it is determined if the current Alist node starting position StartPos is less than the current Dlist node starting position, the Dlist node end position is less than the Alist node end position, and the Dlist node level number equals the Alist node level number plus one. If so, the node pair (a,d) is appended to the output list of join values in step 114. If not, processing continues in step 106.

Figure 4A:
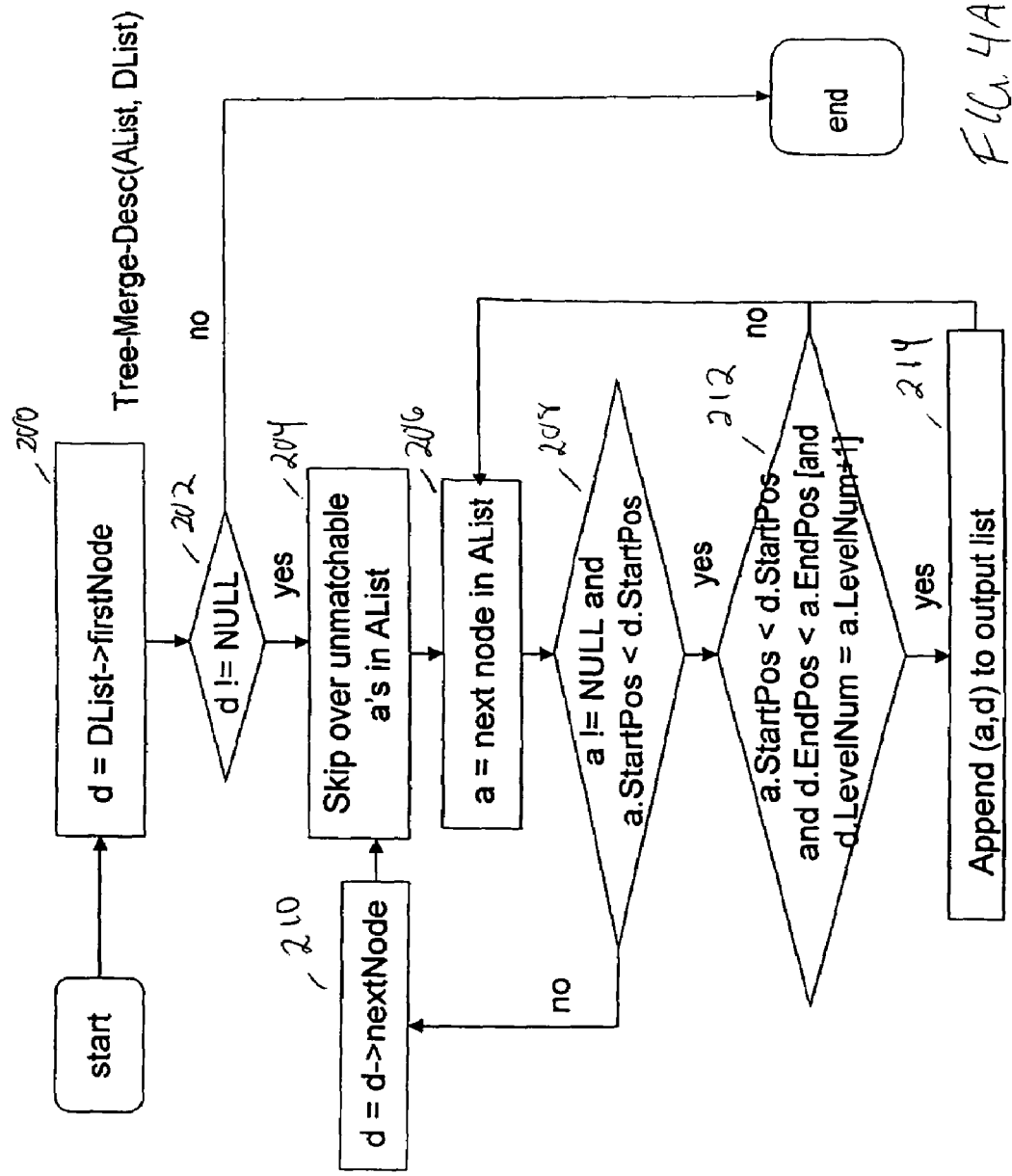
FIG. 4A is a flow diagram showing an exemplary sequence of steps for implementing the algorithm of FIG. 4.

FIG. 4A shows an exemplary sequence of steps for the inventive tree-merge-dec algorithm of FIG. 4. In step 200, variable d is set to the first node in Dlist and in step 202 it is determined whether the first node is not a null value. If not, processing terminates. If so (not a null value), in step 204, Alist nodes that are unmatchable are skipped over. In step 206, a is set to the next node in Alist and it is determined in step 208 whether the current Alist node a is a not a null value and the starting position StartPos of the Alist node is less than the starting position of the current Dlist node. If not, d is set to the next Dlist node in step 210 and processing continues in step 204. If so, in step 212, it is determined if the current Alist node starting position a.StartPos is less than the current Dlist node d.StartPos starting position, the Dlist node end position is less than the Alist node end position, and the Dlist node level number equals the Alist node level number plus one. If so, the node pair (a,d) is appended to the output list of join values in step 214. If not, processing continues in step 206.

Traditional merge joins that use a single equality condition between two attributes as the join predicate can be shown to have time and space complexities O(|input|+|output|) on sorted inputs, while producing a sorted output. In general, one cannot establish the same time complexity when the join predicate involves multiple equality and/or inequality conditions. In accordance with the present invention, criteria under which tree-merge algorithms have asymptotically optimal time complexity can be identified.

In one aspect of the invention, a Tree-Merge-Anc algorithm for ancestor-descendant structural relationship is provided as shown in FIG. 3. The space and time complexities of Algorithm Tree-Merge-Anc are O(|AList|+|DList|+OutputList|) for the ancestor-descendant structural relationship. Consider first the case where no two nodes in AList are themselves related by an ancestor-descendant relationship. In this case, the size of OutputList is O(|AList|+|DList|), Algorithm Tree-Merge-Anc makes a single pass over the input AList and at most two passes over the input DList.

Consider next the case where multiple nodes in AList are themselves related by an ancestor-descendant relationship. This can happen, for example, in the (section, head) structural relationship for the XML data in FIG. 1. In this case, multiple passes may be made over the same set of descendant nodes in DList, and the size of OutputList may be O(|AList|*(|DList|), which is quadratic in the size of the input lists. However, it can be seen that the algorithm still has optimal time complexity, i.e., O(|AList|+(|DList|+|OutputList|).

In another aspect of the invention, a Tree-Merge-Anc for parent-child structural relationships is provided. When evaluating a parent-child structural relationship, the time complexity of Algorithm Tree-Merge-Anc is the same as if one were performing an ancestor-descendant structural relationship match between the same two input lists. However, the size of OutputList for the parent-child structural relationship can be significantly smaller than the size of the OutputList for the ancestor-descendant structural relationship. In particular, consider the case when all the nodes in AList form a (long) chain of length n, and each node in AList has two children in DList, one on either side of its child in AList, as shown in FIG. 5A. In this case, it is relatively easy to verify that the size of OutputList is O(|AList|+|DList|), but the time complexity of Algorithm Tree-Merge-Anc is O((|AList|+|DList|+Output-List|)$^2$). An evaluation of this relationship is shown pictorially FIG. 5B, where each node in AList is associated with the sublist of DList that needs to be scanned. The I/O complexity is also quadratic in the input size in this case.

In a further aspect of the invention, a Tree-Merge-Desc algorithm is provided. The time complexity of the algorithm can be O((|AList|+|DList|+OutputList|)$^2$) in the worst case. This occurs, for example, in the case shown in FIG. 5C, when the first node in AList is an ancestor of each node in DList. In this case, each node in DList has only two ancestors in AList, so the size of OutputList is O(|AList|+|DList|), but AList is repeatedly scanned, resulting in a time complexity of O(|AList|*|DList|), the evaluation of which is depicted in FIG. 5D, where each node in DList is associated with the sublist of AList that needs to be scanned.

In another aspect of the invention, a series of Stack-Tree Join Algorithms are provided. It can be seen that a depth-first traversal of a tree can be performed in linear time using a stack having a size as large as the height of the tree. In the course of this traversal, every ancestor-descendant relationship in the tree is manifested by the descendant node appearing somewhere higher on the stack than the ancestor node. This can provide the basis for a family of stack-based structural join algorithms, with better worst-case I/O and CPU complexity than the tree-merge family, for both parent-child and ancestor-descendant structural relationships.

However, the depth-first traversal idea, while appealing at first glance, cannot be used directly since it requires traversal of the entire database. It would be desirable to traverse only the candidate nodes provided as part of the input lists. The inventive stack-tree family of structural join algorithms are described below. It is believed that these algorithms do not have counterparts in traditional join processing.

For the Stack-Tree-Desc algorithm, consider an ancestor-descendant structural relationship $(e_1, e_2)$. Let AList=[$a_1$, $a_2$, ... ] and DList=[d1, d2, ... ] be the lists of tree nodes that match node predicates $e_1$ and $e_2$, respectively, sorted by the (DocId, StartPos) values of its elements.

The stack-tree algorithm for the case when the output list [($a_i$, $d_j$)] is sorted by (DocId, $d_j$.StartPos, $a_i$.StartPos). This is both simpler to understand and relatively efficient in practice.

FIG. 6 shows the algorithm for the ancestor-descendant case. In general, the algorithm takes the two input operand lists, AList and DList, both sorted on their (DocId, StartPos) values and conceptually merges (interleave) them. As the merge proceeds, it determines the ancestor-descendant relationship, if any, between the current top of stack and the next node in the merge, i.e., the node with the smallest value of StartPos. Based on this comparison, the stack is manipulated, and output produced.

The stack at all times has a sequence of ancestor nodes, each node in the stack being a descendant of the node below it. When a new node from the AList is found to be a descendant of the current top of stack, it is simply pushed on to the stack. When a new node from the DList is found to be a descendant of the current top of stack, it is known that it is a descendant of all the nodes in the stack. Also, it is guaranteed that it will not be a descendant of any other node in AList. Hence, the join results involving this DList node with each of the AList nodes in the stack are output. If the new node in the merge list is not a descendant of the current top of stack, then it is guaranteed that no future node in the merge list is a descendant of the current top of stack, so the stack can be popped, and the test repeated with the new top of stack. No output is generated when any element in the stack is popped.

Figure 6A:
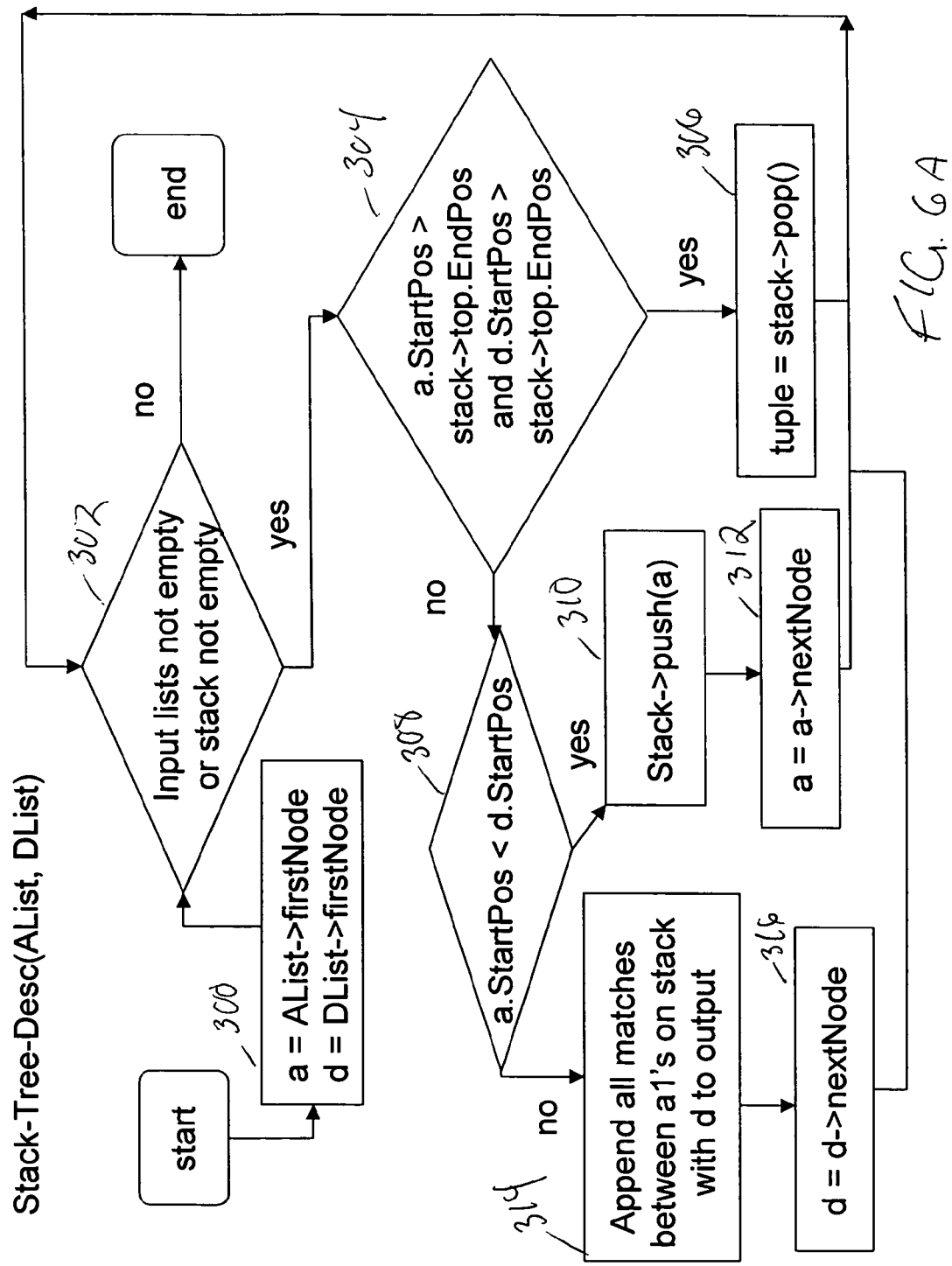
FIG. 6A is a flow diagram showing an exemplary sequence of steps for implementing the algorithm of FIG. 6.

FIG. 6A shows an exemplary sequence of steps for implementing the algorithm of FIG. 6 with the same assumptions set forth above in conjunction with FIG. 3A. In step 300, variable a is set to the first node of Alist and variable d is set to the first node of Dlist. In step 302 it is determined whether the input lists are not empty or the stack is not empty. If not (input lists, stack empty), then processing terminates. If so, in step 304 it is determined whether the starting position of the Alist node a.StartPos is greater than the end position of the node on the top of the stack and the starting position of the Dlist node is greater than the end position of the node on the top of the stack. If so, the top element in the stack is popped in step 306 and processing continues in step 302. If not, in step 308, it is determined whether the start position of the current Alist node is less than the start position of the Dlist node. If so, in step 310, the Alist node is pushed onto the stack and in step 312, the next Alist node is examined with processing continuing in step 302. If not, in step 314 the matches (a1,d) between a1's on the stack are appended to the output list, where a1 is an index on the bottom stack element. In step 316, the next Dlist node is examined with processing continuing in step 302.

The parent-child case of Algorithm Stack-Tree-Desc is simpler since a DList node can join only (if at all) with the top node on the stack. In this case, the "for loop" inside the "else" case of FIG. 6 is replaced with:

if (d.LevelNum_stack→top.LevelNum.1) append (stack→top,d) to OutputList

Figure 8A:
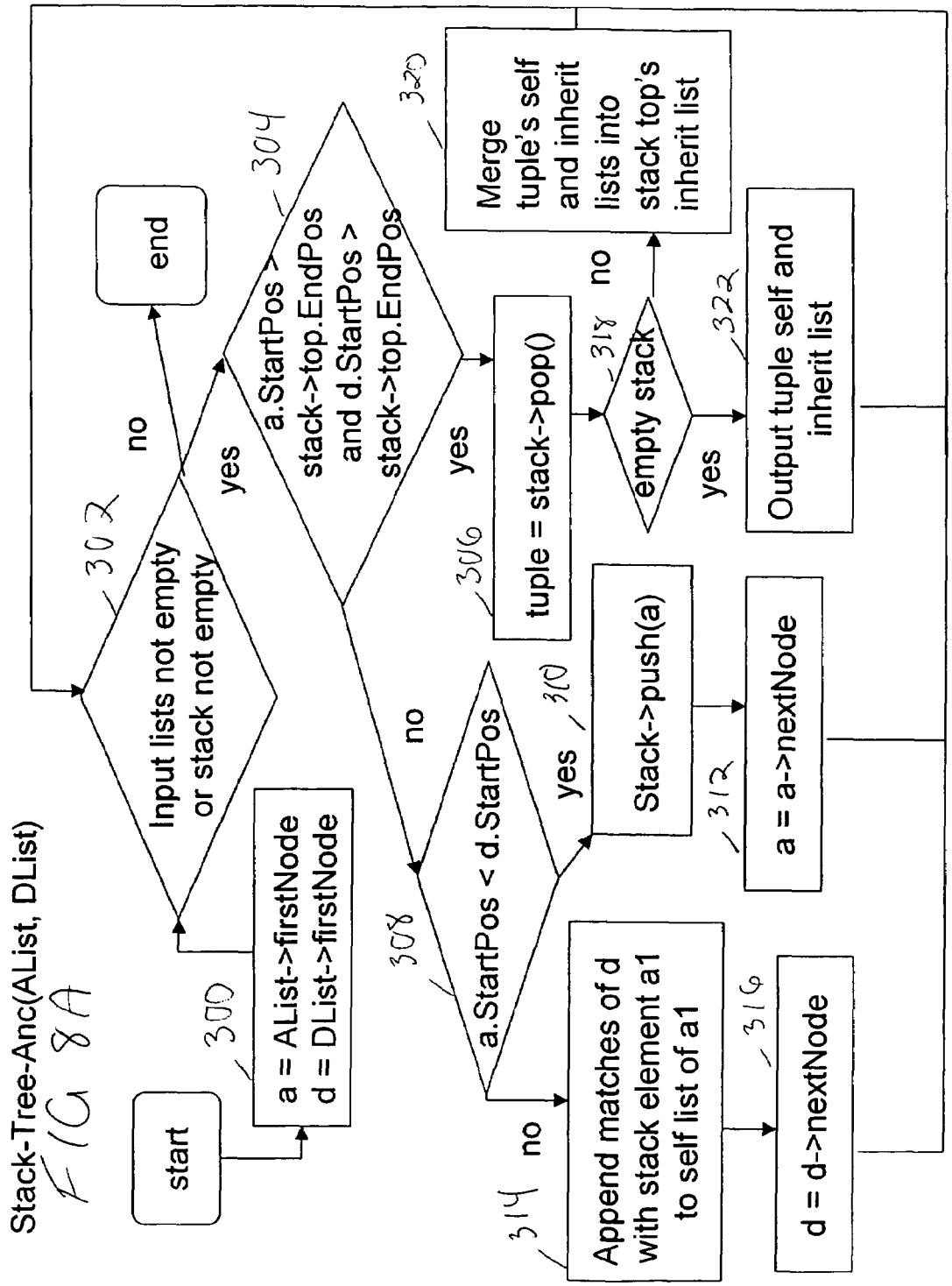
FIG. 8A is a flow diagram showing an exemplary sequence of steps for implementing the algorithm of FIG. 8.

FIG. 8A shows an exemplary sequence of steps for implementing the inventive stack-tree-anc algorithm. As noted above, there is overlap with the stack-tree-desc algorithm set forth in FIG. 6A and a description of common steps is not repeated. After popping the stack in step 306, it is determined in step 318 whether the stack is empty. If so, in step 320 there is a conventional merge of the tuple's self and inherit lists into the stack's top inherit list and processing continues in step 302. If not, in step 322 the tuple self and inherit list is output.

Example for Algorithm Stack-Tree-Desc

Figure 7A:
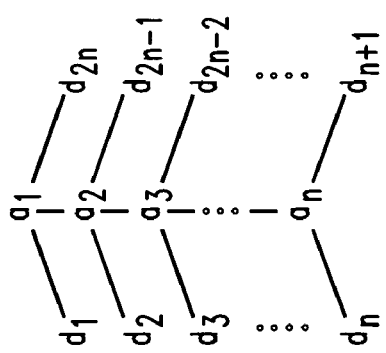
FIG. 7A is an exemplary dataset that can be processed by the Stack-Tree-Desc algorithm of FIG. 6.
Figure 7B:
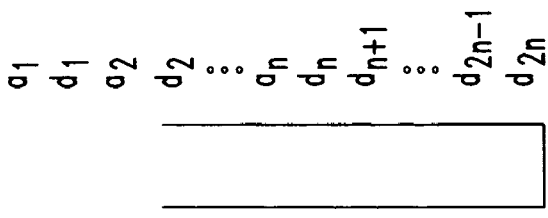
FIGS. 7B-7E show respective processing steps during evaluation of the Stack-Tree-Desc algorithm of FIG. 6.
Figure 7C:
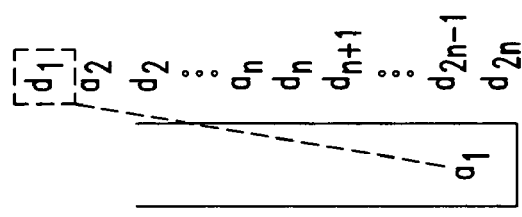
Figure 7D:
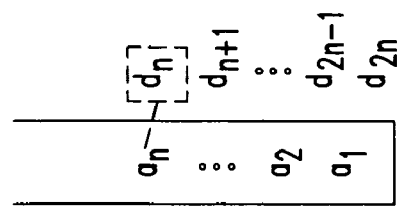
Figure 7E:
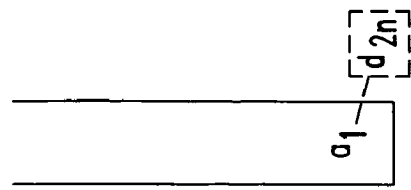

Some steps during an example evaluation of Algorithm Stack-Tree-Desc, for a parent-child structural relationship, on the dataset of FIG. 7A are shown in FIGS. 7B-7E. The $a_i$'s are the nodes in AList and the $d_j$'s are the nodes in DList. Initially, the stack is empty, and the conceptual merge of AList and DList is shown in FIG. 7B. In FIG. 7C, $a_1$ has been put on the stack, and the first new element of the merged list, $d_1$, is compared with the stack top (at this point $a_1$, $d_1$ is output). FIG. 7D illustrates the state of the execution several steps later, when $a_1$, $a_2$, ... $a_n$ are all on the stack, and $d_n$ is being compared with the stack top (after this point, the OutputList includes $a_1$, $d_1$, $(a_2,d_2)$, ..., $(a_n,d_n)$). Finally, FIG. 7E shows the state of the execution when the entire input has almost been processed. Only $a_1$ remains on the stack (all the other $a_i$'s have been popped from the stack), and $d_{2n}$ is compared with $a_1$. Note that all the desired matches have been produced while making only a single pass through the entire input. Recall that this is the same dataset of FIG. 5A, which illustrated the sub-optimality of Algorithm Tree-Merge-Anc, for the case of parent-child structural relationships.

The stack-tree algorithm for the case when the output list [(a_i,d_j)] needs to be sorted by (DocId, a_i.StartPos, d_j.StartPos) is now described. It is not straightforward to modify Algorithm Stack-Tree-Desc described above to produce results sorted by ancestor because of the following: if node a from AList on the stack is found to be an ancestor of some node d in the DList, then every node a' from AList that is an ancestor of a (and hence below a on the stack) is also an ancestor of d. Since the StartPos of a' precedes the start position of a, the system should delay output of the join pair (a,d) until after (a',d) has been output. There remains the possibility of a new element d' after d in the DList joining with a' as long as a' is on stack, so the pair (a,d) cannot be output until the ancestor node a' is popped from stack. Meanwhile, large join results can be built up that cannot yet be output.

An exemplary solution is shown in FIG. 8 for the ancestor-descendant case. As with Algorithm Stack-Tree-Desc, the stack at all times has a sequence of ancestor nodes, each node in the stack being a descendant of the node below it. Now, one associates two lists with each node on the stack: the first, called self-list, is a list of result elements from the join of this node with appropriate DList elements; the second, called inherit-list is a list of join results involving AList elements that were descendants of the current node on the stack. As before, when a new node from the AList is found to be a descendant of the current top of stack, it is simply pushed on to the stack. When a new node from the DList is found to be a descendant of the current top of stack, it is simply added to the self-lists of the nodes in the stack. Again, as before, if no new node (from either list) is a descendant of the current top of stack, then it is guaranteed that no future node in the merge list is a descendant of the current top of stack, so stack can be popped, and the test repeated with the new top of stack. When the bottom element in stack is popped, its self-list is output first and then its inherit-list. When any other element in stack is popped, no output is generated. Instead, its inherit-list is appended to its self-list, and the result is appended to the inherit-list of the new top of stack.

An optimization to the algorithm (incorporated in FIG. 8) is as follows: no self-list is maintained for the bottom node in the stack. Instead, join results with the bottom of the stack are output immediately. This results in a small space savings, and renders the stack-tree algorithm partially non-blocking.

The Algorithm Stack-Tree-Desc is relatively straightforward to analyze. Each AList element in the input may be examined multiple times, but these can be amortized to the element on DList, or the element at the top of stack, against which it is examined. Each element on the stack is popped at most once, and when popped, causes examination of the new top of stack with the current new element. Finally, when a DList element is compared against the top element in stack, then it either joins with all elements on stack or none of them; all join results are immediately output. In other words, the time required for this part is directly proportional to the output size. Thus, the time required for this algorithm is O(|input|+|output|) in the worst case. Putting all this together, it can be seen that the space and time complexities of Algorithm Stack-Tree-Desc can be defined as O(|AList|+|DList|+OutputList|), for both ancestor-descendant and parent-child structural relation-ships. Further, Algorithm Stack-Tree-Desc is a non-blocking algorithm. It is believed that no other known join algorithm that has the same input lists, and is required to compute the same output list, could have better asymptotic complexity.

The I/O complexity analysis is relatively straightforward as well. Each page of the input lists is read once, and the result is output as soon as it is computed. Since the maximum size of stack is proportional to the height of the XML database tree, it seems reasonable to assume that all of stack fits in memory at all time. Hence, the following result can be seen: the I/O complexity of Algorithm Stack-Tree-Desc is $$O\left(\frac{|AList|}{B} + \frac{|DList|}{B} + \frac{|OutputList|}{B}\right)$$

for ancestor-descendant and parent-child structural relationships, where B is the blocking factor, which refers to the size of a disk block.

One difference between the analyses of Algorithms Stack-Tree-Anc and Stack-Tree-Desc is that join results are associated with nodes in the stack in Algorithm Stack-Tree-Anc. It can be seen that the list of join results at any node in the stack is linear in the output size. What remains to be analyzed is the appending of lists each time the stack is popped.

If the lists are implemented as linked lists (with start and end pointers), these append operations can be carried out in unit time, and require no copying. Thus one comparison per AList input and one per output are all that are performed to manipulate stack. Combined with the analysis of Algorithm Stack-Tree-Desc, it can be seen that the time required for this algorithm is still O(|input|+|output|) in the worst case.

The I/O complexity analysis is a somewhat more involved. Certainly, one cannot assume that all the lists of results not yet output fit in memory. Careful buffer management is required. In one embodiment, the only operation performed on a list is to append to it (except for the final read out). As such, one only needs to have access to the tail of each list in memory as computation proceeds. The rest of the list can be paged out. When list x is appended to list y, it is not necessary that the head of list x be in memory, the append operation only establishes a link to this head in the tail of y. So all that is needed is to know the pointer for the head of each list, even if it is paged out. Each list page is thus paged out at most once, and paged back in again only when the list is ready for output. Since the total number of entries in the lists is exactly equal to the number of entries in the output, one has the I/O required on account of maintaining lists of results is proportional to the size of output (provided that there is enough memory to hold in buffer the tail of each list: requiring two pages of memory per stack entry-still a reasonable requirement). Other I/O activity is for the input and output. This leads to the desired linearity result.

The space and time complexities of Algorithm Stack-Tree-Anc are O(|AList|+|DList|+OutputList|), for both ancestor-descendant and parent-child structural relation-ships. The I/O complexity of Algorithm Stack-Tree-Anc is $$O\left(\frac{|AList|}{B} + \frac{|DList|}{B} + \frac{|OutputList|}{B}\right)$$

for both ancestor-descendant and parent-child structural relationships, where B is the blocking factor.

Results of an actual implementation of the various join algorithms for XML data sets are described below. In particular, results for the structural join algorithms namely, TREE-MERGE JOIN (TMJ) and STACK-TREE JOIN (STJ) are provided. Once more, the output can be sorted in two ways, based on the "ancestor" node or the "ancestor" node in the join. Correspondingly, two "flavors" of these algorithms are considered. The suffix "-A" (ancestor) and "-D" (descendant) are used to differentiate between these. The four algorithms are thus labeled: TMJ-A, TMJ-D, STJ-A and STJ-D.

The join algorithms were implemented in a TIMBER XML query engine. As is known in the art, TIMBER is an native XML query engine that is built on top of a SHORE type object manager. Since the goal of TIMBER is to efficiently handle complex XML queries on large data sets, the algorithms were implemented so that they could participate in complex query evaluation plans with pipelining. The experiments using TIMBER were run on a 500 MHz Intel Pentium III processor running WindowsNT Workstation v4.0. SHORE was compiled for a 8 KB page size. SHORE buffer pool size was set to 32 MB, and the container size was 8000 bytes. The numbers presented here were produced by running the experiments multiple times and averaging all the execution times except for the first run (i.e., these are warm cache numbers).

For the workload, the IBM XML data generator was used to generate a number of data sets, of varying sizes and other data characteristics, such as the fanout (MaxRepeats) and the maximum depth, using the Organization DTD presented in FIG. 9. The so-called XMach-1 and XMark benchmarks, were used as well as some real XML data. The results obtained were similar in all cases. Results are presented for the largest organization data set that was generated. This data set consists of 6.3 million element nodes, corresponding to approximately 800 MB of XML documents in text format. The characteristics of this data set in terms of the number of occurrences of element tags are summarized in FIG. 9A.

The various join algorithms were evaluated using the set of queries shown in FIG. 9B. The queries are broken up into two classes. QS1 to QS6 are simple structural relationship queries, and have an equal mix of parent-child queries and ancestor-descendant queries. QC1 and QC2 are complex chain queries, and are used to demonstrate the performance of the algorithms when evaluating complex queries with multiple joins in a pipeline.

The focus in the experiments is to characterize the performance of the four structural join algorithms, and understand their differences. Before doing so, some additional detail regarding the manner in which these were implemented for the experiments reported is presented. The choice of implementation, i.e., on top of SHORE and TIMBER, was driven by the need for sufficient control. It is understood that the algorithms themselves could just as well have been implemented on many other plat-forms, including (as new join methods) on relational databases.

The join algorithms were implemented using the so-called operator iterator model. In this model, each operator provides an open, next and close interface to other operators, and allows the database engine to construct an operator tree with an arbitrary mix of query operations (different join algorithms or algorithms for other operations such as aggregation) and naturally allows for a pipelined operator evaluation. To support this iterator model, attention is paid to the manner in which results are passed from one operator to another. Algorithms such as the TMJ algorithms may need to repeatedly scan over one of the inputs. Such repeated scans are feasible if the input to a TMJ operator is a stream from a disk file, but is not feasible if the input stream originates from another join operator (in the pipeline below it). The TMJ algorithms were implemented so that the nodes in a current sweep are stored in a temporary SHORE file. On the next sweep, this temporary SHORE file is scanned. This allows limitation of the memory used by TMJ implementation, as the only memory used is managed by the SHORE buffer manager, which takes care of evicting pages of the temporary file from the buffer pool if required. Similarly for the STJ-A algorithm, the inherit- and self-lists are stored in a temporary SHORE file, again limiting the memory used by the algorithm. In both cases, the implementation turns logging and locking off for the temporary SHORE files. Note that STJ-D can join the two inputs in a single pass over both inputs, and, never has to spool any nodes to a temporary file.

To amortize the storage and access overhead associated with each SHORE object, the nodes are grouped into a large container object, and a SHORE object is created for each container. The join algorithms write nodes to containers and when a container is full it is written to the temporary SHORE file as a SHORE record. The performance benefits of this approach are substantial as will be appreciated by one of ordinary skill in the art.

Figure 10:
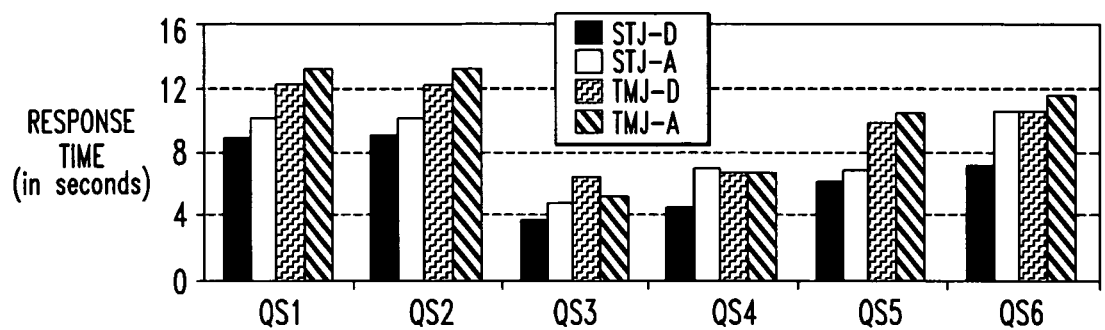
FIG. 10 is a graphical depiction of the performance of algorithms in accordance with the present invention in an illustrative implementation.

The performance of the STJ and the TMJ algorithms are compared using all the six simple queries, QS1-QS6, shown in FIG. 9B. FIG. 10 plots the performance of the four algorithms. As shown, the STJ-D algorithm outperforms the remaining algorithms in all cases. It is believed that the reason for the superior performance of STJ-D is because of its ability to join the two data sets in a single pass over the input nodes, and it never has to write any nodes to intermediate files on disk.

It can also be seen that STJ-A usually has better performance than both TMJ-A and TMJ-D. For queries QS4 and QS6, the STJ-A algorithms and the two TMJ algorithms have comparable performance. These queries have large result sizes (approximately 600K and 1M tuples respectively as shown in FIG. 9A. Since STJ-A keeps the results in the lists associated with the stack, and can output the results only when the bottom-most element of the stack is popped, it has to perform many writes and transfers of the lists associated with the stack elements. In the exemplary implementation, these lists are maintained in temporary SHORE files. With larger result sizes this list management slows down the performance of STJ-A in practice. It can also be seen that the two TMJ algorithms have comparable performance.

These experiments were also ran with reduced buffer sizes and it was found that for this data set the execution time of all the algorithms remained fairly constant. Even though the XML data sets are relatively large, after applying the predicates, the candidate lists that are joined are not very large. Furthermore, the effect of buffer pool size may be significant when one of the inputs has nodes that are deeply nested amongst themselves, and the node that is higher up in the XML tree has many nodes that it joins with.

For example, consider the TMJ-A algorithms, and the query "manager/employee". If many manager nodes are nested below a manager node that is higher up in the XML tree, then after the join of the manager node at the top is done, repeated scans of the descendant nodes will be required for the manager nodes that are descendants of the manager node at the top. Such scenarios are rare in the illustrative data set, and, consequently, the buffer pool size has only a marginal impact on the performance of the algorithms.

The performance of the algorithms using the two complex chain queries, QC1 and QC2, from FIG. 9B is now evaluated. Each query has two joins and for this example, both join operations are evaluated in a pipeline. For each complex query one can evaluate the query by using only ancestor-based join algorithms or using only descendant-based join algorithms. These two approaches are labeled with suffixes "-A2" and "-D2" for the ancestor-based and descendant-based approaches, respectively.

Figure 11:
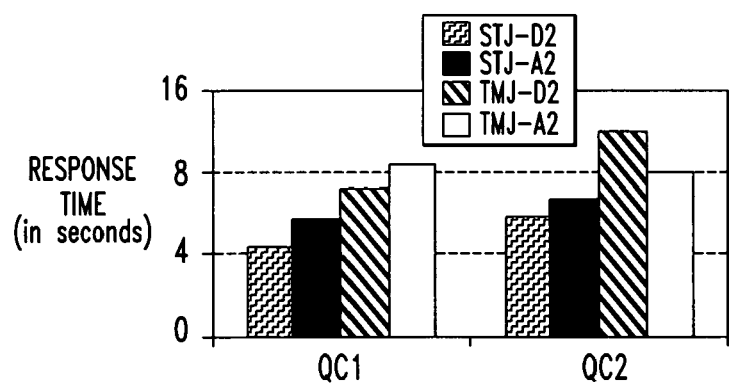
FIG. 11 is a further graphical depiction of the performance of algorithms in accordance with the present invention in an illustrative implementation.

The performance comparison of the STJ and TMJ algorithms for both query evaluation approaches (A2 and D2) is shown in FIG. 11. From the figure, it can be seen that STJ-D2 has the highest performance once again, since it is never has to spool nodes to intermediate files.

The present invention provides novel join algorithms for dealing with a core operation central to much of XML query processing, both for native XML query processor implementations as well for relational XML query processors. In particular, the Stack-Tree family of structural join algorithms is both I/O and CPU optimal, and practically efficient.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of query pattern matching, comprising:
    (a) generating a list of potential ancestors and a list of potential descendants;
    (b) sorting the list of potential ancestors and the list of potential descendants in order of a first attribute in a database;
    (c) skipping over unmatchable nodes in the list of potential descendants;
    (d) determining whether a second attribute of a current node in the potential descendant list is less than a second attribute of a current node in the potential ancestor list;
    (e) determining, based upon a result from (d), whether a first attribute of the current node of the potential ancestor list is less than a first attribute of the current node of the potential descendant list, a second attribute of the current node of the potential descendant list is less than a second attribute of the current node of the potential ancestor list, and a level number of the current node of the potential descendant list is equal to a level number plus one of the current node of the potential ancestor list; and
    (f) appending to an output join list, based upon a result from (e), a node pair comprising the current node of the potential ancestor list and the current node of the potential descendant list.

2. The method according to claim 1, wherein the first attribute corresponds to a start position.

3. The method according to claim 1, wherein the second attribute corresponds to an end position.

4. The method according to claim 1, further including matching the query pattern against an Extensible Markup Language (XML) database.

5. The method according to claim 1, further including sorting the output join list in ancestor/parent order.

6. A method of query pattern matching, comprising:
    (a) generating a list of potential ancestors and a list of potential descendants;
    (b) sorting the list of potential ancestors and the list of potential descendants in order of a start position attribute in a database;
    (c) skipping over unmatchable nodes in the list of potential ancestors;
    (d) determining whether a start position of a current node in the potential ancestor list is less than a start position of a current node in the potential descendant list;
    (e) determining, based upon a result from (d), whether a start position of the current node of the potential ancestor list is less than a start position of the current node of the list of potential descendants, an end position of the current node of the potential descendant list is less than an end position of the current node of the potential ancestor list, and a level number of the current node of the potential descendant list is equal to a level number plus one of the current node of the potential ancestor list; and
    (f) appending to an output join list, based upon a result from (e), a node pair comprising the current node of the potential ancestor list and the current node of the potential descendant list.

7. The method according to claim 6, further including matching the query pattern in an Extensible Markup Language (XML) document.

8. The method according to claim 6, further including sorting the output join list in descendant/child order.

* * * * *